US012782976B2

(12) United States Patent
Hirai et al.

(10) Patent No.: US 12,782,976 B2
(45) Date of Patent: Nov. 3, 2026

(54) METHOD FOR SETTING FLIGHT PATH OF UNMANNED AERIAL VEHICLE

(71) Applicant: MITSUBISHI HEAVY INDUSTRIES, LTD., Tokyo (JP)

(72) Inventors: Makoto Hirai, Tokyo (JP); Ichiro Oba, Tokyo (JP); Takuro Yamaji, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 141 days.

(21) Appl. No.: 18/818,594

(22) Filed: Aug. 29, 2024

(65) Prior Publication Data

US 2025/0110511 A1 Apr. 3, 2025

(30) Foreign Application Priority Data

Sep. 28, 2023 (JP) ................................ 2023-166804

(51) Int. Cl.

| | |
|---|---|
| ***G05D 1/80*** | (2024.01) |
| ***G01C 21/34*** | (2006.01) |
| ***G05D 1/248*** | (2024.01) |
| ***G05D 1/646*** | (2024.01) |
| ***G05D 109/20*** | (2024.01) |

(52) U.S. Cl.

CPC ........... *G05D 1/80* (2024.01); *G01C 21/3453* (2013.01); *G05D 1/248* (2024.01); *G05D 1/646* (2024.01); *G05D 2109/20* (2024.01)

(58) Field of Classification Search

None

See application file for complete search history.

(56) References Cited

U.S. PATENT DOCUMENTS 12,298,409 B2 * 5/2025 Bennington .......... G01S 19/215
2024/0194083 A1 * 6/2024 Riedinger ................ G08G 5/21

FOREIGN PATENT DOCUMENTS

JP H0962353 A 3/1997
JP 2008-304260 A 12/2008
JP 2018147467 A 9/2018
JP 2018-157522 A 10/2018
JP 2018-165930 A 10/2018
JP 2020101391 A 7/2020

OTHER PUBLICATIONS

Japan Patent Office, Notice of Reasons for Refusal for Japanese Patent Application No. 2023-166804 mailed on Feb. 3, 2026; 10 pp.

* cited by examiner

*Primary Examiner* — Todd Melton

(74) *Attorney, Agent, or Firm* — HAUPTMAN HAM, LLP

(57) ABSTRACT

A method for setting a flight path of an unmanned aerial vehicle includes calculating an availability state, in an unmanned aerial vehicle, of artificial satellites based on a positional relationship between the artificial satellites constituting a global navigation satellite system and the unmanned aerial vehicle at any of points in a scheduled path of the unmanned aerial vehicle flying autonomously. The method further includes comparing the availability state calculated and a reference availability state required for flight control of the unmanned aerial vehicle.

13 Claims, 6 Drawing Sheets

METHOD FOR SETTING FLIGHT PATH OF UNMANNED AERIAL VEHICLE

CROSS-REFERENCE TO RELATED APPLICATIONS

This application claims the benefit of priority to Japanese Patent Application Number 2023-166804 filed on Sep. 28, 2023. The entire contents of the above-identified application are hereby incorporated by reference.

TECHNICAL FIELD

The present disclosure relates to a path setting method for an unmanned aerial vehicle (UAV) in flight.

RELATED ART

In autonomous flight, a UAV acquires radio waves relating to position information from a global navigation satellite system (GNSS) and flies on a scheduled flight path while confirming its position. When acquisition of radio waves from the GNSS stops, it is necessary to switch to manual operation by a pilot or to land in a safe zone that has been previously programmed as a fail-safe function in the UAV.

In the case of manual operation by the pilot, it is necessary to operate the UAV by visual observation of the UAV or by referring to an image of a camera mounted on the UAV.

In the latter programming as well is it impossible to check a position of one's own vehicle because the GNSS cannot be used. Thus, there is a need for additional equipment such as equipment for landing in a safe zone using, for example, image recognition by artificial intelligence (AI) on images of an onboard camera, or equipment for deploying a parachute and crash-landing. However, safety is not necessarily guaranteed.

JP 2008-304260 A discloses an image processing device that obtains an image of a specific area over which the pilot is flying by correcting a position and attitude of the unmanned aircraft based on a captured image, even when the acquisition of radio waves from the Global Positioning System (GPS), an example of a GNSS, has been stopped. JP 2008-304260 A uses an image acquisition means mounted on a UAV to create an image database of an image acquired during movement and references the image database when the GPS link is interrupted. Then, a correlation value between the image in the image database and a current image is calculated, and an error estimate value of the position and attitude of the unmanned aircraft is calculated by performing coordinate conversion using a highly correlated image as a reference value. The obtained error estimate value of the position and attitude is input to GPS/INS (Global Positioning System/Inertial Navigation System) calculation, and the position and attitude are detected.

SUMMARY

According to JP 2008-304260 A, the flight of the UAV can be continued even after the acquisition of radio waves from the GPS has stopped. However, the UAV in JP 2008-304260 A assumes flight over a specific area multiple times, and it is necessary to obtain image data about the flight path in advance. In other words, the proposal in JP 2008-304260 A cannot be applied when the flight to the destination is performed for the first time or the flight path to the destination is traveled for the first time.

Thus, the present disclosure aims to provide a path setting method for a UAV that can continue the flight without interrupting the acquisition of radio waves from a GNSS even when image data has not been acquired for the flight path.

A method for setting a flight path of an unmanned aerial vehicle, includes:

- a step 1 of calculating an availability state, in an unmanned aerial vehicle, of artificial satellites based on a positional relationship between the artificial satellites constituting a global navigation satellite system and the unmanned aerial vehicle at any of points in a scheduled path of the unmanned aerial vehicle flying autonomously; and
- a step 2 of comparing the availability state calculated in the step 1 and a reference availability state required for flight control of the unmanned aerial vehicle.

According to the present disclosure, even when image data has not been acquired for the flight path, there is provided a path setting method for the UAV that can continue the flight without interrupting the acquisition of radio waves from the GNSS.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments will be described with reference to the attached drawings.

When setting the flight path before a UAV 10 flies autonomously, the present embodiment determines whether the number n of available satellites constituting a GNSS (satellite availability number) has reached a reference satellite availability number N required for flight control of the UAV 10. In the present embodiment, the satellite availability number n is calculated based on the elevation angle θ with respect to a surrounding environment of the UAV 10. In the result of present embodiment, this determination result is reflected in determining the flight path. Note that an example of determining the satellite availability number n will be described here, but it is possible to determine dilution of precision (DOP), which is an index of positioning accuracy, instead of or in conjunction with the satellite availability number n, as described later.

Flight Path FP: See FIG. 1

Figure 1:
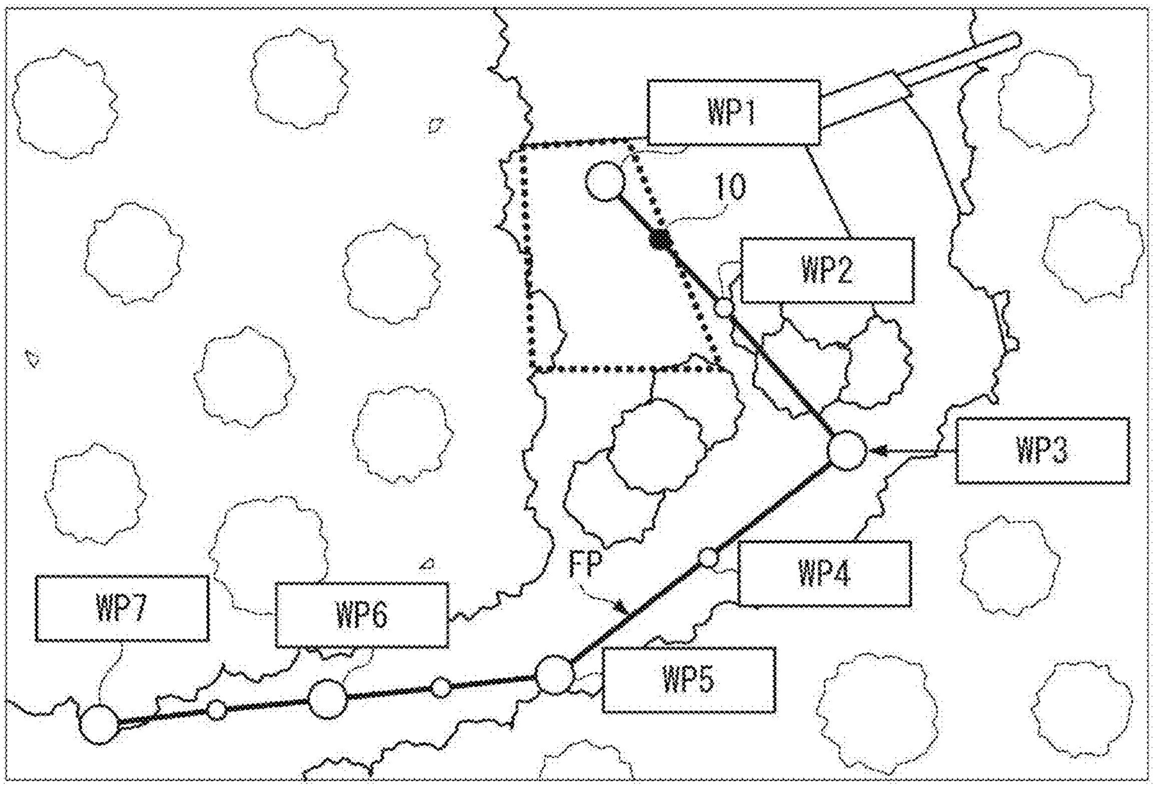
FIG. 1 is a diagram illustrating an example of a flight path set in an embodiment.

The present embodiment sets as an example the flight path FP illustrated in FIG. 1. This flight path FP sets WP1, WP2, WP3, WP4, WP5, WP6, and WP7 as waypoints. Although only up to WP7 are illustrated here, the flight path FP has waypoints not less than WP8.

Waypoints are point information on the flight path FP, and in the present embodiment, is constituted of three elements, latitude (latitude, x), longitude (longitude, y), and altitude (altitude, z), as illustrated below. However, the following flight path FP is tentatively set, and at least one of WP1 to WP7 is corrected based on the result of the determination made on the satellite availability number n, and the final flight path FP is determined.

Flight Path FP

WP1: (x1, y1, z1), WP2: (x2, y2, z2)
WP3: (x3, y3, z3), WP4: (x4, y4, z4)
WP5: (x5, y5, z5), WP6: (x6, y6, z6)
WP7: (x7, y7, z7)

Obstacle to Satellite Availability: See FIGS. 2 and 3

The UAV 10 can fly autonomously by acquiring information necessary for calculating the position with respect to the ground. This information can be obtained from the global navigation satellite system (GNSS). GNSS includes the Global Positioning System (GPS), QZSS (Japan), GLONASS (Russia), Galileo (EU), or the like. Any of these systems can be used for the present embodiment. These GNSSs are constituted of multiple artificial satellites (hereinafter simply called satellites) orbiting around the earth. Multiple satellites that constitute a GNSS orbit around the earth, so that their positions vary depending on the date and time. Information on a relationship between the date and time and the position of the satellite in a GNSS is publicly available.

As an example, there are not less than 30 satellites constituting GPS around the earth, each orbiting one of six orbits in 12 hours. The GPS receiver in the UAV 10 receives radio waves from at least 4 of these satellites and calculates its own location information, by typically using a computational method called three-dimensional positioning. Thus, the surrounding environment of the UAV 10 may have an obstacle, preventing reception of radio waves from as many satellites as necessary to calculate location information, that is, preventing satellite availability. The surrounding environment includes a natural environment having mountains, trees and the like, as well as an artificial environment having high-rise buildings and the like.

Figure 2:
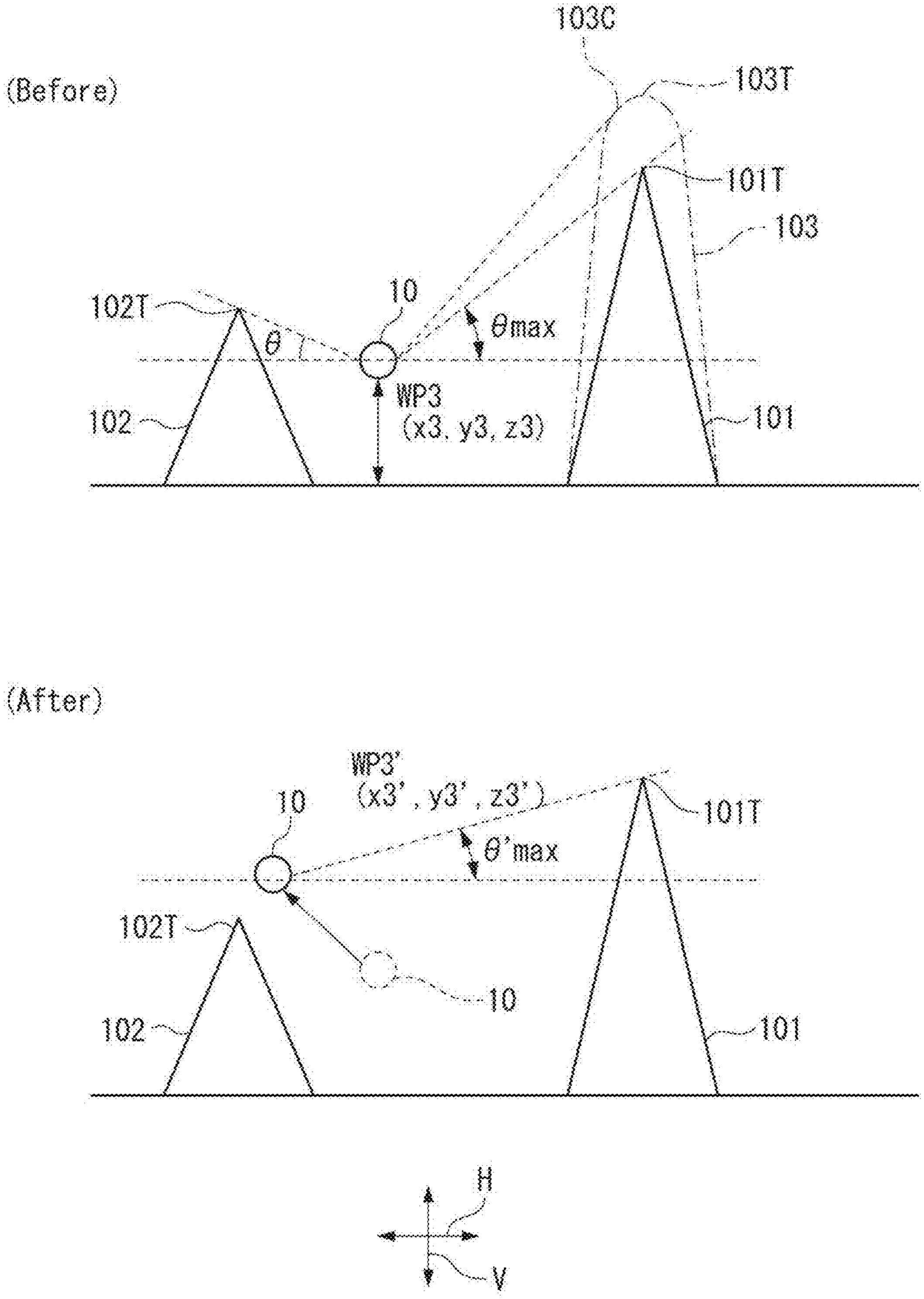
FIG. 2 is a diagram describing a maximum elevation angle θmax and the correction.

Since the flight path FP illustrated in FIG. 1 illustrates an example of following a mountainous area, mountains can be an obstacle to satellite availability. FIG. 2 schematically illustrates a relationship between the UAV 10 and obstacles 101, 102 consisting of peripheral mountains in WP3, for example. In WP3, the UAV 10 is sandwiched between an obstacle 101 and an obstacle 102. When the elevation angle θ with respect to an apex 101T of the obstacle 101 or an apex 102T of the obstacle 102 with respect to the UAV 10 are compared, the elevation angle θ with respect to the apex 101T is larger, which becomes the maximum elevation angle θmax in WP3.

The position of the UAV 10 in WP3 is known, and the location information on the obstacle 101 consisting of a mountain and the apex 101T is also known as topographic data, so that the elevation angle θ can be obtained by calculation.

In addition, although both the obstacle 101 and the obstacle 102 have been described here, the maximum elevation angle θmax means the maximum elevation angle in the 360° azimuth relative to WP3. Although the use of the maximum elevation angle θmax is a preferred form that is simple to calculate and requires only a short period of time, it is also possible to calculate the elevation angle θ in the interval of the predetermined angle for the 360° azimuth and compare the satellite availability number n and the reference satellite availability number N for each calculated elevation angle θ.

For the elevation angle, the point where the straight line drawn from the UAV 10 meets the outline (ridge) of the obstacle (contact point) is the point where the elevation angle θ is specified, and in the case of the obstacles 101, 102, the apexes 101T and 102T with the highest elevations are the contact points. However, when the outline includes, for example, arc, as in the case of an obstacle 103 illustrated by the dashed line in FIG. 2 (Before), a contact point 103C is a point different from the apex 103T.

Figure 3:
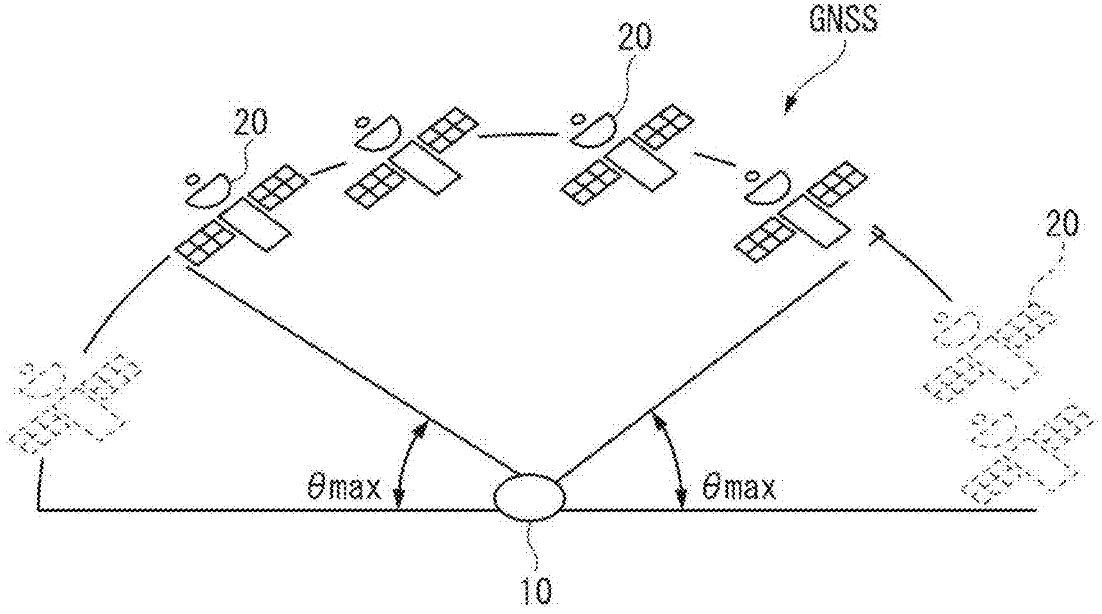
FIG. 3 is a diagram illustrating a relationship between the maximum elevation angle θmax and satellite capable of receiving radio waves.

The larger the elevation angle θ with respect to the apex of the obstacle, the greater the obstacle obstructs availability of the satellite that constitutes the GNSS. FIG. 3 illustrates the maximum elevation angle θmax and the availability state of multiple satellites 20. In FIG. 3, the satellite 20 indicated by the solid line indicates that the receiver provided by the UAV 10 is receiving the radio wave and a satellite 20 is available, and the satellite 20 indicated by the dashed line indicates that the satellite 20 is not available to the UAV 10. When the maximum elevation angle θmax becomes larger than illustrated, the number n of available satellites 20 becomes smaller. Note that the number of available satellites, four in FIG. 3, is only an example.

Assuming that the maximum elevation angle θmax for WP3 illustrated in FIG. 2 (Before) does not reach a reference number of satellites 20 making it possible to identify the position of the UAV 10. For example, when the GNSS used is GPS, the case where the reference number is three, corresponds to this. Thus, when the set WP3 (x3, y3, z3) remains, the receiver of the UAV 10 cannot calculate its own position because the availability number n is insufficient. Thus, as illustrated in FIG. 2 (After), the WP3 that is a waypoint is corrected. The correction of the waypoint is performed by changing the position. More specifically, one or both of the position in a vertical direction V and the position in a horizontal direction H are changed to become the correction position. In the example illustrated in FIG. 2, both the position in the vertical direction V and the position in the horizontal direction H are changed and corrected to, for example, WP3' (x3', y3', z3'). Although the maximum elevation angle θ'max is also present in WP3', correction is performed so that the relationship between the pre-corrected maximum elevation angle θmax and the maximum elevation angle θ'max satisfies θmax>θ'max, and so that the number of available satellites 20 at the maximum elevation angle θ'max becomes, for example, four, enabling the UAV 10 to calculate its own position.

To reduce the elevation angle θ, it is easiest to change the altitude of the waypoint upward in the vertical direction V. However, for example, according to Japanese aviation laws, the flight altitude of the UAV 10 is limited to no more than 150 m in principle. Thus, even when only the altitude is changed to ensure the availability number n, the flight altitude regulations cannot be adhered to. Thus, the present embodiment can select one or both of the correction to vertical direction V and correction to horizontal direction H.

When the UAV 10 is flying, the actual satellite availability number n in a control unit 11 can be recognized. However, the actual satellite availability number n cannot be recognized at the stage of setting the flight path FP before the flight targeted by the present embodiment. Thus, in the present embodiment, the satellite availability number n is calculated based on the elevation angle θ. Information on the satellite 20 that constitutes the GNSS is publicly available, thereby the satellite availability number n can be calculated by calculating the elevation angle θ.

Figure 4:
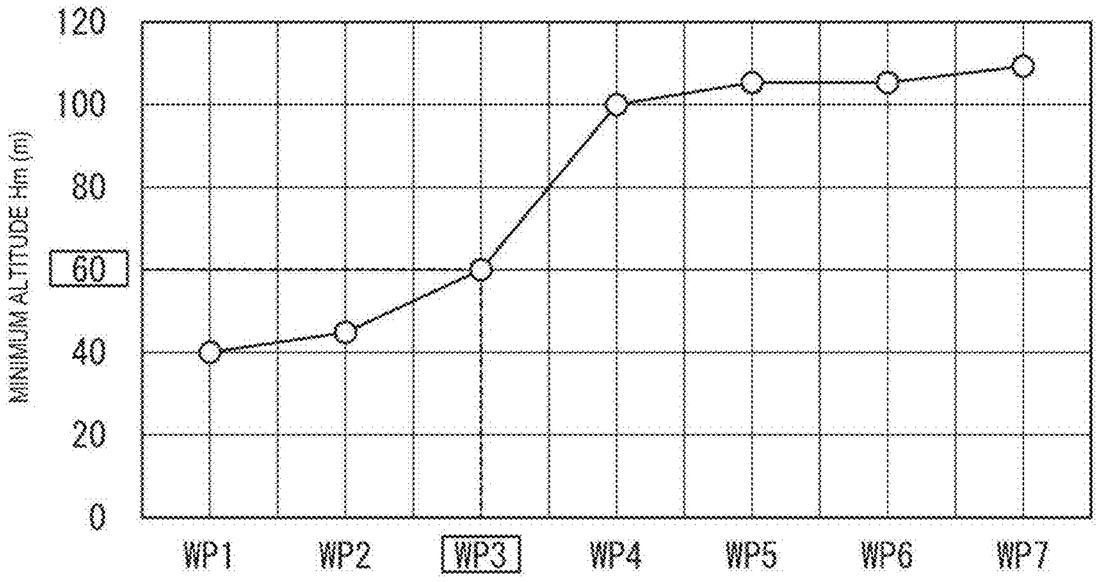
FIG. 4 is a graph illustrating a relationship between a plurality of waypoints and a minimum altitude for obtaining the number of available satellites necessary for flight control.

Minimum Altitude for Securing Reference Satellite Availability Number N: FIG. 4

Although WP3 is illustrated above, it is possible to specify a minimum altitude Hm for securing the reference satellite availability number N for calculating the position of the UAV 10 for other waypoints such as WP1. FIG. 4 illustrates an example thereof. FIG. 4 illustrates only altitude in waypoints.

In FIG. 4, in WP1, when the altitude is 40 m, the reference satellite availability number N capable of calculating its own position is secured, and in WP3, when the altitude is 60 m, the reference satellite availability number N capable of calculating its own position is secured. In WP4 to WP7, the minimum altitude exceeds 100 m, which indicates that the altitude of mountains or the like being obstacles in the surrounding area is high.

Example of Path Setting with Correction: See FIGS. 5 and 6

Next, an example of a path setting procedure with correction will be described. This path setting is performed before the flight of the UAV 10, and the procedure illustrated in FIG. 5 is performed by the control unit 11 of the UAV 10 illustrated in FIG. 6.

Figure 5:
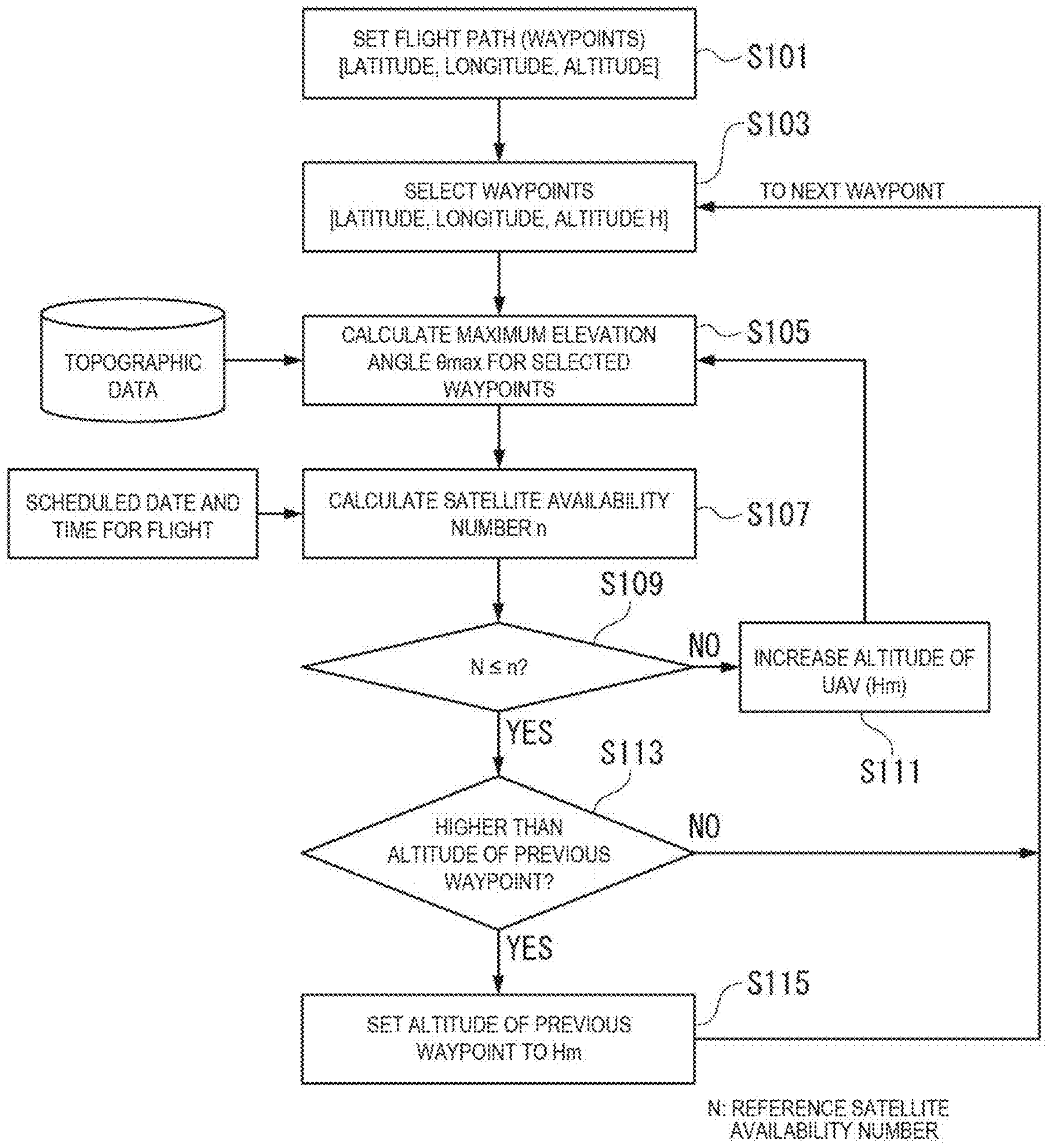
FIG. 5 is a flow diagram illustrating a control procedure in an embodiment.
Figure 6:
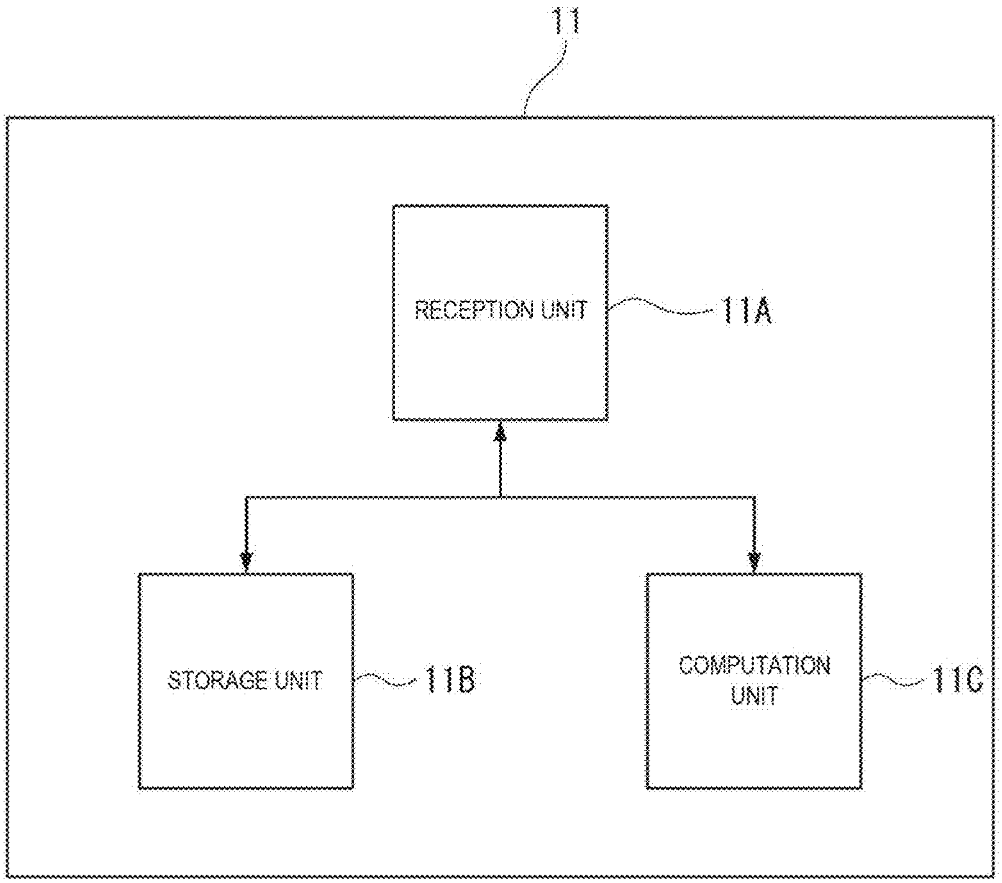
FIG. 6 is a diagram illustrating a configuration example of a control unit for executing the control procedure in an embodiment.

First, the flight path FP is set (FIG. 5, S101). The flight path FP is set through multiple waypoints. The flight path FP at this time can be referred to as a temporary flight path FP because it includes the possibility of correction in a later step. The temporary flight path FP is stored in a storage unit 11B provided in the control unit 11. Each waypoint includes three elements, which are latitude, longitude, and altitude, as described above. The method for setting the flight path FP at this time is free, and can be set by a person based on topographic data, or can be set by a computer device based on topographic data. At this time, the latitude and longitude are set according to the topographic data, but the altitude can be set to the same value for all waypoints. This is because the altitude is likely to be subject to correction in the present embodiment. In addition, the setting of the flight path FP can be performed directly on the UAV 10, or the setting by a device other than the UAV 10 can be stored in the UAV 10.

Next, the satellite availability number n and the reference satellite availability number N are compared and determined for each of the waypoints set tentatively. For this purpose, waypoints are selected (FIG. 5, S103). For example, when seven waypoints of WP1 to WP7 illustrated in FIG. 1 are set, WP1 is first selected, and a comparison determination is made between the satellite availability number n and the reference satellite availability number N in WP1. When the comparison determination is finished between the satellite availability number n and the reference satellite availability number N in WP1, WP2 is then selected, and a comparison determination is made between the satellite availability number n and the reference satellite availability number N in WP2. Thereafter, the selection and comparison determination of WP3, the selection and comparison determination of WP4, . . . , and the selection and comparison determination of WP7 are performed. The comparison determination and correction are executed by a computation unit 11C of the control unit 11 by referring to the location information on the flight path FP stored in the storage unit 11B.

When a waypoint is selected, the maximum elevation angle θmax at the selected waypoint is calculated (FIG. 5, S105). The calculation of the maximum elevation angle θmax is performed by referring to the topographic data held in advance. As an example of this topographic data, the data generated by interpolation of the peak value at 5 m interval or the like based on the altitude data measured in the aerial laser survey by the Geographical Survey Institute in Japan.

When the maximum elevation angle θmax is calculated, the satellite availability number n, which is the number of satellites that can acquire the information necessary to calculate the position from the global navigation satellite system (GNSS) at the waypoint, is calculated (FIG. 5, S107). In calculating the satellite availability number n, the date and time when the UAV flies the flight path FP is also considered. This is because, as mentioned above, the positions of the multiple satellites that constitute the global navigation satellite system (GNSS) are different depending on the date and time because the satellites orbit around the earth.

When the satellite availability number n is calculated, the size relationship and the reference satellite availability number N at the waypoint are compared (FIG. 5, S109). When the satellite availability number n reaches the reference satellite availability number N (N≤n, S109: YES), the correction of the setting information (latitude, longitude and altitude) at the waypoint is unnecessary. When the satellite availability number n does not reach the reference satellite availability number N (N>n, S109: No), the correction of the setting information (latitude, longitude and altitude) at the waypoint is necessary.

When the correction of the setting information at the waypoint is necessary, the altitude of the UAV 10 in the setting information (latitude, longitude and altitude) is increased as an example (FIG. 5, S111). The increase of the altitude can be a specified value, for example, A(m). When a comparison and determination for WP3 is assumed to be performed now, z3 of WP3 is corrected to Z3' obtained by adding A(m) to z3. Assuming that the altitude after correction is Z3', the maximum elevation angle θmax is calculated (FIG. 5, S105) and the satellite availability number n is calculated (FIG. 5, S107). This procedure is repeated until the satellite availability number n reaches the reference satellite availability number N.

When it is determined that the satellite availability number n has reached the satellite availability number N (N≤n), determination is performed whether the altitude is higher than the altitude of a previous waypoint (FIG. 5, S113). This is because a possibility exists that the satellite availability number n does not exceed the reference satellite availability number N between the previous waypoint and the waypoint currently subject to comparison and determination. For example, when the waypoint currently subject to comparison and determination is WP3, the altitude is compared with the previous WP2. When the altitude of WP3 is z3 and the altitude of WP2 is z2, the relationship between z3 and z2 is compared.

When the waypoint currently being compared and determined is WP3 and its altitude is z3, the altitude of the previous WP2 is corrected from z2 to z3.

After the above comparisons, determinations, and necessary corrections are made for all waypoints, setting of the flight path FP is completed and the UAV 10 is ready for flight. The flight path FP whose setting is completed, is stored in the storage unit 11B. When the UAV 10 flies autonomously, the storage unit 11B specifies its own position by the radio wave received at a reception unit 11A, from the satellite 20, and compares the identified position of the UAV 10 and the flight path FP stored in the storage unit 11B.

Effect Produced by Embodiments

According to the present embodiment, the satellite availability number n for constituting the global navigation satellite system (GNSS) is calculated based on the elevation angle θ calculated by referring to the topographic data, and comparing is performed between the satellite availability number n and the reference satellite availability number N required for flight control. Based on the comparison result, one or both of the vertical direction position (Pv) and the horizontal direction position (Hv) of the UAV 10 is changed. Thus, according to the present embodiment, the acquisition of radio waves from the GNSS is not interrupted, and the flight of the UAV 10 can be secured.

The configuration mentioned in the above embodiments can be selected or changed to another configuration as appropriate.

Although the above embodiments have described an example of comparing between the satellite availability number n and the reference satellite availability number N for the waypoints, the present disclosure can perform the comparison, determination and correction processing at any point in the flight path. More specifically, the processing can be performed at a default interval on the flight path, for example, an interval of 100 m.

Although the above embodiments illustrate examples of applying the present disclosure when setting the path before the flight of the UAV, the present disclosure can also be applied to the UAV actually in flight. For example, a UAV in flight can recognize the satellite availability number n, but, for example, it cannot be specified whether the reference satellite availability number N required for flight control can be secured by increasing the altitude of the UAV. However, even when the satellite availability number n of the UAV in flight becomes insufficient, the reference satellite availability number N required for flight control can be secured by applying the procedure illustrated in FIG. 5, for example.

Although the above embodiment uses the satellite availability number as an object for comparing and determining, DOP (Dilution of Precision: positioning accuracy degradation coefficient) can be used as a substitute for the satellite availability number or in addition to comparing and judging the satellite availability number. DOP varies due to the geometric positional relationship between the UAV 10 (reception unit 11A) and the satellite 20, and the smaller the DOP, the more accurate the positioning. In other words, DOP can also be information specifying the availability state of the satellite 20, and the DOP can be improved by correcting the position of the UAV.

Here, the satellite availability number is specified based on the positional relationship between the satellite 20 that constitutes the GNSS and the UAV 10 (reception unit 11A), and the DOP is also an availability state specified based on the positional relationship between the satellite 20 and the UAV 10 (reception unit 11A). Thus, in the present disclosure, a positioning accuracy degradation coefficient d and a reference positioning accuracy degradation coefficient D can be compared and determined as substitutes for the satellite availability number n and the reference satellite availability number N, and necessary correction can be applied to setting of the flight path FP of the UAV 10.

In the above embodiment, an example of specifying the elevation angles θ for the apexes 101T and 102T of the respective obstacles 101 and 102 has been described. However, depending on the shape of the obstacle, it is necessary to specify the elevation angle θ for a position different from the apex.

For example, as illustrated in FIG. 2 (Before), assume the obstacle 103 whose outline (ridge) forms an arc shape. In the case of the obstacle 103, when comparing is performed between the elevation angle θ for an apex 103T and the elevation angle θ for the contact point 103C obtained by drawing the tangent from the UAV 10 to the obstacle 103, the elevation angle θ for the contact point 103C is larger, which is the maximum elevation angle θmax in WP3.

Supplementary Notes

The present disclosure is recognized as follows.

Supplementary Note 1

A method for setting a flight path of an unmanned aerial vehicle, includes:

- a step 1 of calculating an availability state, in an unmanned aerial vehicle, of artificial satellites based on a positional relationship between the artificial satellites constituting a global navigation satellite system and the unmanned aerial vehicle at any of points in a scheduled path of the unmanned aerial vehicle flying autonomously; and
- a step 2 of comparing the availability state calculated in the step 1 and a reference availability state required for flight control of the unmanned aerial vehicle.

Supplementary Note 2

In the method for setting a flight path according to Supplementary Note 1, preferably the step 1 includes:

- a step 1-1 of calculating an elevation angle θ at any of the points; and
- a step 1-2 of calculating an availability number n of the artificial satellites capable of acquiring information required for calculating a position from the global navigation satellite system based on the elevation angle θ calculated in the step 1-1, and
- in the step 2, the calculated availability number n and a reference satellite availability number N required for flight control are compared.

Supplementary Note 3

In the comparing in the step 2 of Supplementary Note 2, when the availability number n has not reached the reference satellite availability number N,

- a correction position is calculated for changing one or both of a position in a vertical direction and a position in a horizontal direction of the unmanned aerial vehicle, and
- the step 1-1, the step 1-2, and the step 2 are executed for the correction position.

Supplementary Note 4

Preferably,

- the step 1-1, the step 1-2, and the step 2 are executed for the correction position, and
- when the availability number n has reached the reference satellite availability number N, the correction position is incorporated into the scheduled path.

Supplementary Note 5

In the comparing in the step 2 according to any one of Supplementary Notes 1 to 3,

- preferably, when the availability number n has reached the reference satellite availability number N, the scheduled path is adhered to.

Supplementary Note 6

In the step 1-1 according to any one of Supplementary Notes 2 to 5, preferably a maximum elevation angle θmax is calculated at any of the points, and

- in the step 1-2, the availability number n is calculated based on the maximum elevation angle θmax.

Supplementary Note 7

In any one of Supplementary Notes 2 to 5, preferably the step 1 and the step 2 are executed when setting the scheduled path.

Supplementary Note 8

In Supplementary Note 7, the step 1 and the step 2 are executed for a plurality of the points separated by a predetermined interval in the scheduled path or for a plurality of waypoints in the scheduled path.

Supplementary Note 9

In any one of Supplementary Notes 1 to 7, preferably the step 1 and the step 2 are executed when the unmanaged aerial vehicle is flying autonomously according to the set scheduled path.

Supplementary Note 10

In Supplementary Note 1, preferably in the step 1, a positioning accuracy degradation coefficient d at the one of points is calculated, and in the step 2, the calculated positioning accuracy degradation coefficient d and a reference positioning accuracy degradation coefficient D required for flight control are compared.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A method for correcting a flight path, comprising:

a step 1 of calculating an availability number n, in an unmanned aerial vehicle, of artificial satellites based on a positional relationship between the artificial satellites constituting a global navigation satellite system and the unmanned aerial vehicle for each of multiple points in a scheduled path of the unmanned aerial vehicle flying autonomously; and a step 2 of comparing the availability state calculated in the step 1 and a reference availability state required for flight control of the unmanned aerial vehicle, wherein, in the step 2, if the availability number n of the point (WPn) has not reached a reference satellite availability number N, an amendment position is calculated for changing at least one of a position in a vertical direction or a position in a horizontal direction of the unmanned aerial vehicle, and the calculated correction position is incorporated into the scheduled path, wherein in the step 2, if (i) the availability number n of the point (WPn) has reached the reference satellite availability number N, and (ii) an altitude at the point (WPn) is higher than an altitude at an immediately preceding point (WPn−1), the altitude at the immediately preceding point (WPn−1) is adjusted to the altitude at the point (WPn).

2. The method for setting correcting a flight path according to claim 1, wherein the step 1 comprises:

a step 1-1 of calculating an elevation angle θ with respect to vertices of obstacles affecting satellite acquisition at any of the multiple points; and a step 1-2 of calculating an availability number n of the artificial satellites capable of acquiring information required for calculating a position from the global navigation satellite system based on the elevation angle θ calculated in the step 1-1, and in the step 2, the calculated availability number n and the reference satellite availability number N required for flight control are compared.

3. The method for correcting a flight path according to claim 2, wherein in the comparing in the step 2, when the availability number n has not reached the reference satellite availability number N, a correction position is calculated for changing one or both of the position in the vertical direction and a position in a horizontal direction of the unmanned aerial vehicle, and the step 1-1, the step 1-2, and the step 2 are executed for the correction position.

4. The method for correcting a flight path according to claim 3, wherein the step 1-1, the step 1-2, and the step 2 are executed for the correction position, and when the availability number n has reached the reference satellite availability number N, the correction position is incorporated into the scheduled path.

5. The method for correcting a flight path according to claim 2, wherein in the comparing in the step 2, when the availability number n has reached the reference satellite availability number N, the scheduled path is adhered to.

6. The method for correcting a flight path according to claim 2, wherein in the step 1-1, a maximum elevation angle θmax is calculated at any of the multiple points, and in the step (1-2), the availability number n is calculated based on the maximum elevation angle θmax.

7. The method for correcting a flight path according to claim 2, wherein the elevation angle θ is calculated by referring to topographic data stored in the unmanned aerial vehicle.

8. The method for correcting a flight path according to claim 1, wherein the step 1 and the step 2 are executed when analyzing the scheduled path.

9. The method for correcting a flight path according to claim 8, wherein the step 1 and the step 2 are executed for a plurality of the multiple points separated by a predetermined interval in the scheduled path or for a plurality of waypoints in the scheduled path.

10. The method for correcting a flight path according to claim 1, wherein the step 1 and the step 2 are executed when the unmanaged aerial vehicle is flying autonomously according to the scheduled path.

11. The method for correcting a flight path according to claim 1, wherein in the step 1, a positioning accuracy degradation coefficient d at any of the multiple points is calculated, and in the step 2, the calculated positioning accuracy degradation coefficient d and a reference positioning accuracy degradation coefficient D required for flight control are compared.

12. The method for correcting a flight path according to claim 1, wherein the step 1 and the step 2 are executed by a control unit of the unmanned aerial vehicle, and the scheduled path incorporating the calculated correction position is stored in a storage unit of the control unit.

13. The method for correcting a flight path according to claim 12, wherein the unmanned aerial vehicle flies autonomously along the scheduled path while a reception unit of the control unit receives radio waves from the artificial satellites, and the control unit compares a position of the unmanned aerial vehicle identified based on the received radio waves with the scheduled path stored in the storage unit.

* * * * *